W. SCHARUN, Sr.
FOOT MEASURE.
APPLICATION FILED SEPT. 20, 1918.
1,297,500.
Patented Mar. 18, 1919.
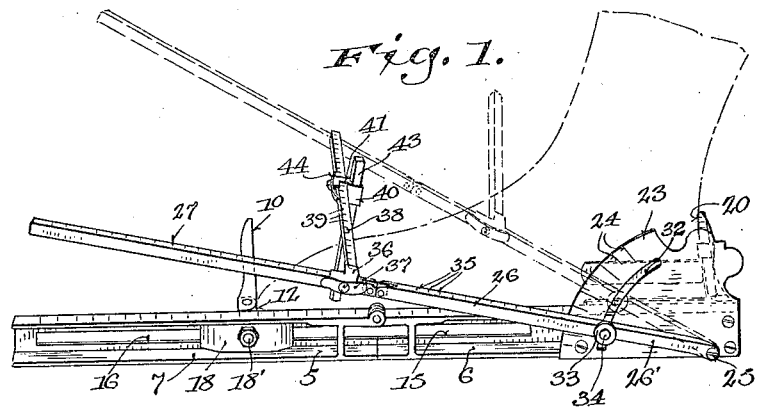
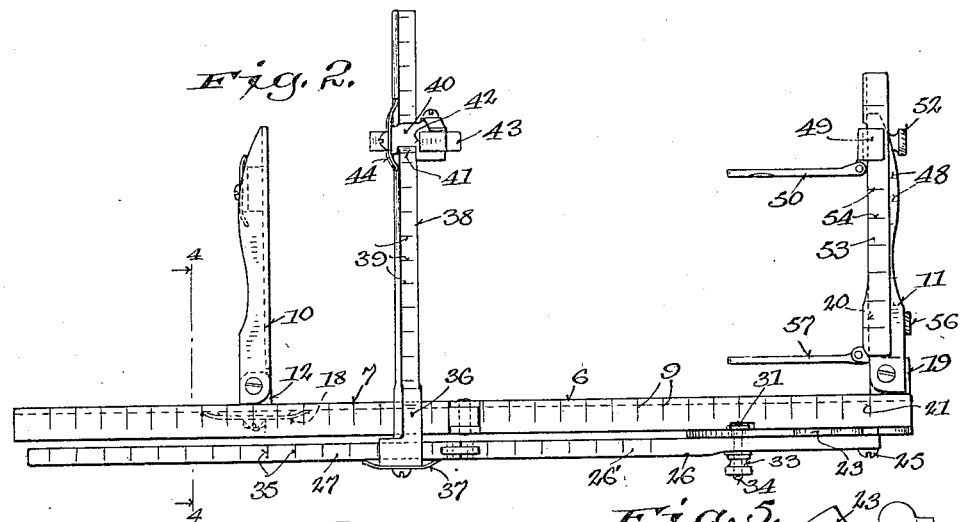
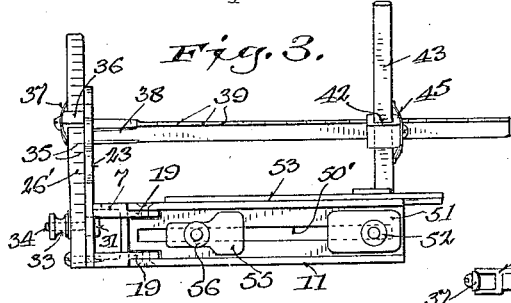
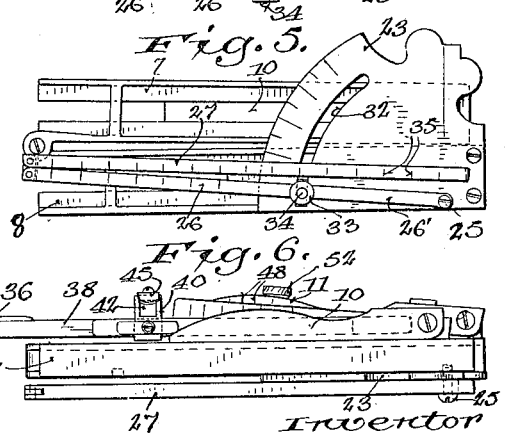
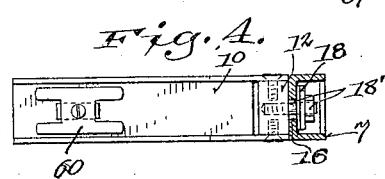
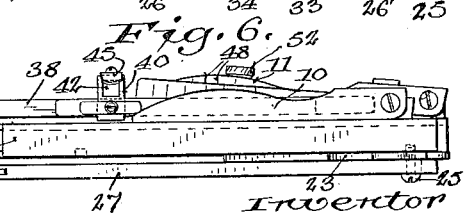
Inventor
William Scharun Sr.
By Morsell, Kenney & French,
Attorneys.

UNITED STATES PATENT OFFICE.

WILLIAM SCHARUN, SR., OF MILWAUKEE, WISCONSIN.

FOOT-MEASURE.

1,297,500.      Specification of Letters Patent.      Patented Mar. 18, 1919.

Application filed September 20, 1918. Serial No. 254,941.

*To all whom it may concern:*

Be it known that I, WILLIAM SCHARUN, Sr., a citizen of the United States, and resident of Milwaukee, in the county of Milwaukee and State of Wisconsin, have invented new and useful Improvements in Foot-Measures, of which the following is a description, reference being had to the accompanying drawings, which are a part of this specification.

The invention relates to measuring devices and more particularly to an instrument for measuring the feet to facilitate making shoes to order and is fully described and explained in the specification and shown in the accompanying drawings in which:

Figure 1 is a perspective view of the device; Fig. 2 is a plan view thereof; Fig. 3 is a rear end view thereof; Fig. 4 is a section taken on the line 4—4 of Fig. 2; Fig. 5 is a side view of the device when folded up; Fig. 6 is a plan view of the device when folded up.

The device comprises an instrument for measuring the length of the foot, the heel, the instep, the ball, the toe and the back of the heel.

The means for measuring the length of the foot consists of a rule 5 having parts 6 and 7 hingedly connected together with the scale designations 9 thereon and heel and toe engaging members 10 and 11 adjustable with respect to each other and operatively connected to the rule.

The member 10 is pivotally connected to a block 12 which has a part 13 slidably mounted in alined slots 15 and 16 in the parts 6 and 7 of the rule and said member is releasably held in adjusted position with respect to the rule by means of a spring plate 18 secured to the block by a bolt 18′ and yieldingly engageable with the inner side of the rule.

The member 11 is pivotally connected to ears 19 projecting laterally from the rear end of the part 7 and the front 20 of this member is in line with the zero mark 21 of the rule.

With this construction with the foot on a flat support the rule is laid down as shown in Fig. 1 and the member 11 brought up against the heel and then the member 10 is moved along the rule until its inner side engages the end of the foremost toe of the foot and the position of the side 22 with respect to the scale is noted and this reading taken from the scale giving the length of the foot.

A protractor plate 23 is secured to the side of the part 6 at its rear end and has a scale 24 thereon in angular measurement, the angles being measured from the center of a screw 25 which is in line with the zero mark 21.

Pivotally mounted on this screw 25 is a two part rule 26′ consisting of parts 26 and 27 hingedly connected together and this rule is adapted to be secured in different angular positions by means of a T-head clamping block 31 carried thereby and movable in an arcuate slot 32 in the plate 23 and adapted to clamp said rule and plate together by means of a thumb nut 33 in threaded engagement with an extension 34 of the block. This rule is provided with scale designations 35.

Slidably mounted upon the rule 26′ is a collar or block 36 yieldingly maintained in different positions along the rule by means of a spring plate 37 connected to it and bearing at its ends against a side of the rule 26′ and a rule 38 provided with scale designations 39 is secured to said collar.

Slidably mounted upon the rule 38 is a block 40 having a scale reading edge 41 coöperating with the scale 39 and having an opening 42 receiving a support and measuring member 43. The block 40 is yieldingly maintained in adjusted position on the rule 38 by a spring plate 44 connected to it and bearing at its ends against one side of the rule 38 and the member 43 is adjustably secured to the block by means of a spring plate 45 connected to it and bearing at its ends against one side of said member 43.

The protractor and the rules 26′ and 38 are used to obtain the heel and instep measurements by moving the rule 26′ about its pivot and moving the rule 38 along the rule 26′ until it engages the foot slightly above the instep for the heel measurement and at the instep for the instep measurement the exact position to which the rule 38 is moved to engage the foot being understood by those skilled in the art, the parts being shown in dotted lines in Fig. 1 in the position for taking the instep measurement. For each measurement the angle between the base of the plate 23 and the lower edge 46 of the rule is noted, and the scale reading on the rule 26' is determined by the position of the inner edge 47 of the collar 36 with respect to the scale 35, said inner edge being in line with the inner side of the rule 38.

The protractor, rules 26' and 38 and the member 43 are used to obtain the ball and toe measurements. In measuring the ball of the foot the rule 26' is swung about its pivot and the rule 38' moved along the rule 26' so that it will rest on the foot above the ball and then the member 43 is moved along the rule 38 until it engages the ball of the foot after which the reading of the inclination of the rule 26' and the position of the rule 38 with respect to the rule 26' is taken as before and the distance of the edge 41 from the rule 26' is then read off from the scale 39. The toe measurement is taken in a similar way when the rule 26' is swung down so that when the rule 38 is moved along the rule 26' it will rest on the foot above the toe and then the member 43 is moved along the rule 38 until it engages the toe.

To obtain the width of the heel and its position with respect to a given line formed by the length measuring rule, the member 11 is provided with a scale 48 by which the position of a setting member 49 having a heel engaging plate 50 hingedly connected thereto is initially determined, said member 49 having a part slidable in a slot 50' in the member 11 and to which a spring plate 51, bearing upon the inner side of the member 11, is secured by a thumb nut 52. Slidably mounted on the member 11 is a slide or plate 53 carrying a scale 54 and having a part slidable in the slot 50' in the member 11 and to which a spring plate 55, bearing upon the inner side of the member 11, is secured by a thumb nut 56. A heel engaging plate 57 is hingedly connected to the inner end of the slide 53.

To obtain the measurement of the width of the heel the foot is placed upon a flat support and the measuring rule 6, 7 laid along the inner side of the foot and the member 49 moved with respect to the member 11 to bring the plate 50 against the outer side of the heel and the distance of this plate from the rule 6 and 7 is noted from the scale 48 and then the slide 53 is moved with respect to the member 11 and plate 50 to bring the plate 57 against the inner side of the heel and the distance between the plates 50 and 57 is noted from the scale 54.

With the measurements thus obtained the shape of the foot may be laid out by the shoemaker, the last made and the parts forming the shoe can be cut to the proper size.

As the parts 6 and 7 are hingedly connected together and the parts 26 and 27 are hingedly connected together and the members 10 and 11 are hingedly connected to the sections 7 and 6 respectively, the parts of the device may be readily folded up in compact form as shown in Figs. 5 and 6. Previous to folding the parts 26 and 27 of the rule 26', the rule 38 is removed from the rule 26' and the member 43 is removed from the rule 38 by slipping the block 40 from said rule. After the member 10 is folded down against the rule 5 the rule 38 and member 43 are secured to the back side of the rule by slipping them in under a spring slip 60 secured to the back side of the member 10.

What I claim as my invention is:

1. In a foot measure, the combination of means for measuring the length of the foot, means for obtaining the instep measurement and the vertical heel measurement, means coöperating with said instep and heel measuring means for measuring the ball and toe of the foot, and means for measuring the back of the heel.

2. In a foot measure, the combination, with a support of a rule pivotally secured thereto, a protractor coöperating with said rule for measuring the inclination with respect to the base, a rule slidably mounted on the first named rule and extending at an angle thereto and adapted to engage the foot, and a member slidably mounted with respect to the second named rule and adapted to engage the foot.

3. In a foot measure, the combination with a support of a member projecting at right angles thereto, and heel engaging members adjustably movable upon said member and with respect to each other to determine the measure of the back of the heel and the distance of the inner side of the heel from a given base line.

4. In a foot measure, the combination with a length-measuring rule, of foot engaging members carried thereby and coöperating with said rule to determine the length of the foot, a second rule pivotally secured to the rear end of the first named rule, a third rule slidably mounted upon the second rule and adapted to engage the foot, and means for measuring the inclination of the second rule with respect to the first rule when the third rule engages the foot.

5. In a foot measure, the combination with a length measuring rule, of foot engaging members carried thereby and coöperating with said rule to determine the length of the foot, a second rule pivotally secured to the rear end of the first named rule, a third rule slidably mounted upon the second rule and adapted to engage the foot, means for measuring the inclination of the second rule with respect to the first rule when the third rule engages the foot, and a member slidably mounted on the third rule and adapted to engage the foot.

6. In a foot, the combination of a rule, a fixed member secured at one end thereof, a movable member mounted on said rule and coöperating therewith and with the fixed member to determine the length of the foot, members adjustably mounted on said fixed member for determining the measure of the back of the heel, and means for determining the vertical heel, instep, ball and toe measurements of the foot.

In testimony whereof, I affix my signature.

WILLIAM SCHARUN, Sr.

Copies of this patent may be obtained for five cents each, by addressing the "Commissioner of Patents, Washington, D. C."